United States Patent
Gabilondo Peñalba

(10) Patent No.: US 11,491,577 B2
(45) Date of Patent: Nov. 8, 2022

(54) METHOD OF AND SYSTEM FOR WELDING USING AN ENERGY BEAM SCANNED REPEATIVELY IN TWO DIMENSIONS

(71) Applicant: ETXE-TAR, S.A., Elgoibar (ES)

(72) Inventor: José Juan Gabilondo Peñalba, Elgoibar (ES)

(73) Assignee: ETXE-TAR, S.A., Elgoibar (ES)

( * ) Notice: Subject to any disclaimer, the term of this patent is extended or adjusted under 35 U.S.C. 154(b) by 642 days.

(21) Appl. No.: 16/334,652

(22) PCT Filed: Sep. 18, 2017

(86) PCT No.: PCT/EP2017/073519
§ 371 (c)(1),
(2) Date: Mar. 19, 2019

(87) PCT Pub. No.: WO2018/054850
PCT Pub. Date: Mar. 29, 2018

(65) Prior Publication Data
US 2021/0187660 A1    Jun. 24, 2021

(30) Foreign Application Priority Data
Sep. 21, 2016   (EP) .................................. 16382442

(51) Int. Cl.
*B23K 26/00*     (2014.01)
*B23K 26/082*    (2014.01)
(Continued)

(52) U.S. Cl.
CPC ............ *B23K 26/082* (2015.10); *B23K 26/24* (2013.01); *B23K 26/34* (2013.01)

(58) Field of Classification Search
CPC ...... B23K 26/082; B23K 26/24; B23K 26/32; B23K 26/242; B23K 26/26
See application file for complete search history.

(56) References Cited

U.S. PATENT DOCUMENTS 6,740,845 B2   5/2004 Stol et al.
8,907,246 B2 * 12/2014 Sasabe ................ B23K 26/211
                                                   219/121.64
(Continued)

FOREIGN PATENT DOCUMENTS

CN   105817766   8/2016
CN   105855722   8/2016
(Continued)

OTHER PUBLICATIONS

India Office Action for corresponding India Application No. 201937010693; Application Filing Date: Mar. 19, 2019; dated Dec. 23, 2020; 6 pages.

(Continued)

*Primary Examiner* — Dana Ross
*Assistant Examiner* — Lawrence H Samuels
(74) *Attorney, Agent, or Firm* — Cantor Colburn LLP

(57) ABSTRACT

A method for establishing a weld joint comprises the step of projecting an energy beam such as a laser beam (2) onto an interface area (103) between two parts (101, 102) to be joined. The beam (2) is projected onto the interface area (103) so as to produce a primary spot on the interface area (103), and the beam (2) is repetitively scanned in two dimensions in accordance with a scanning pattern so as to establish an effective spot (21) on the object, the effective spot (21) having a two-dimensional energy distribution. The effective spot (21) is displaced along a track (104) over the interface area (103) so as to progressively melt mating portions of the first part (101) and the second part (102) so as to form the weld joint (105). The effective spot (21) can feature an asymmetric energy distribution.

14 Claims, 16 Drawing Sheets

(51) Int. Cl.
*B23K 26/24* (2014.01)
*B23K 26/34* (2014.01)

(56) References Cited

U.S. PATENT DOCUMENTS

| | | | | |
|---|---|---|---|---|
| 10,406,620 | B2* | 9/2019 | Tsuji | B23K 9/028 |
| 10,688,561 | B2* | 6/2020 | Diaz | B28B 1/001 |
| 2005/0205539 | A1 | 9/2005 | Borgoltz et al. | |
| 2007/0084835 | A1 | 4/2007 | Dinauer et al. | |
| 2008/0245777 | A1* | 10/2008 | Cremerius | B23K 26/40 |
| | | | | 219/121.64 |
| 2012/0074111 | A1* | 3/2012 | Sasabe | B23K 26/32 |
| | | | | 219/121.85 |
| 2014/0291304 | A1* | 10/2014 | Mudd, II | B23K 26/32 |
| | | | | 219/121.61 |
| 2016/0016261 | A1* | 1/2016 | Mudd, II | B23K 26/32 |
| | | | | 219/121.61 |
| 2016/0114428 | A1 | 4/2016 | Wang et al. | |
| 2016/0207141 | A1 | 7/2016 | Conseil | |
| 2017/0239724 | A1* | 8/2017 | Diaz | B28B 1/001 |

FOREIGN PATENT DOCUMENTS

| | | |
|---|---|---|
| DE | 256274 A1 | 5/1988 |
| DE | 256275 A1 | 5/1988 |
| DE | 102012008940 | 11/2013 |
| DE | 102013107228 | 4/2014 |
| DE | 102014105941 | 11/2014 |
| DE | 202014105648 | 12/2014 |
| DE | 102014107716 | 6/2015 |
| DE | 102013110523 | 8/2016 |
| EP | 1013372 A1 | 6/2000 |
| RU | 2322334 | 4/2008 |
| SU | 2112636 | 6/1988 |
| WO | 2014037281 | 3/2014 |
| WO | 2014190971 | 12/2014 |
| WO | 2015135715 | 9/2015 |
| WO | 2016026706 | 2/2016 |
| WO | 2016118555 | 7/2016 |

OTHER PUBLICATIONS

Korea Notification of Reason for Refusal for Korea Application No. 10-2019-7008307; Application filing Date: Mar. 21, 2019; dated Jun. 22, 2021, 11 pages, with Machine Translation.

Seifert, M. et al., High Power Diode Laser Beam Scanning in Multi-Kilowatt Range, Proceedings of the 23rd International Congress on Applications of Lasers and Electro-optics 2004 (6 pages).

Klocke, F. et al, Flexible scanner-based laser surface treatment, Physics Procedia, vol. 5, pp. 467-475 (2010).

* cited by examiner

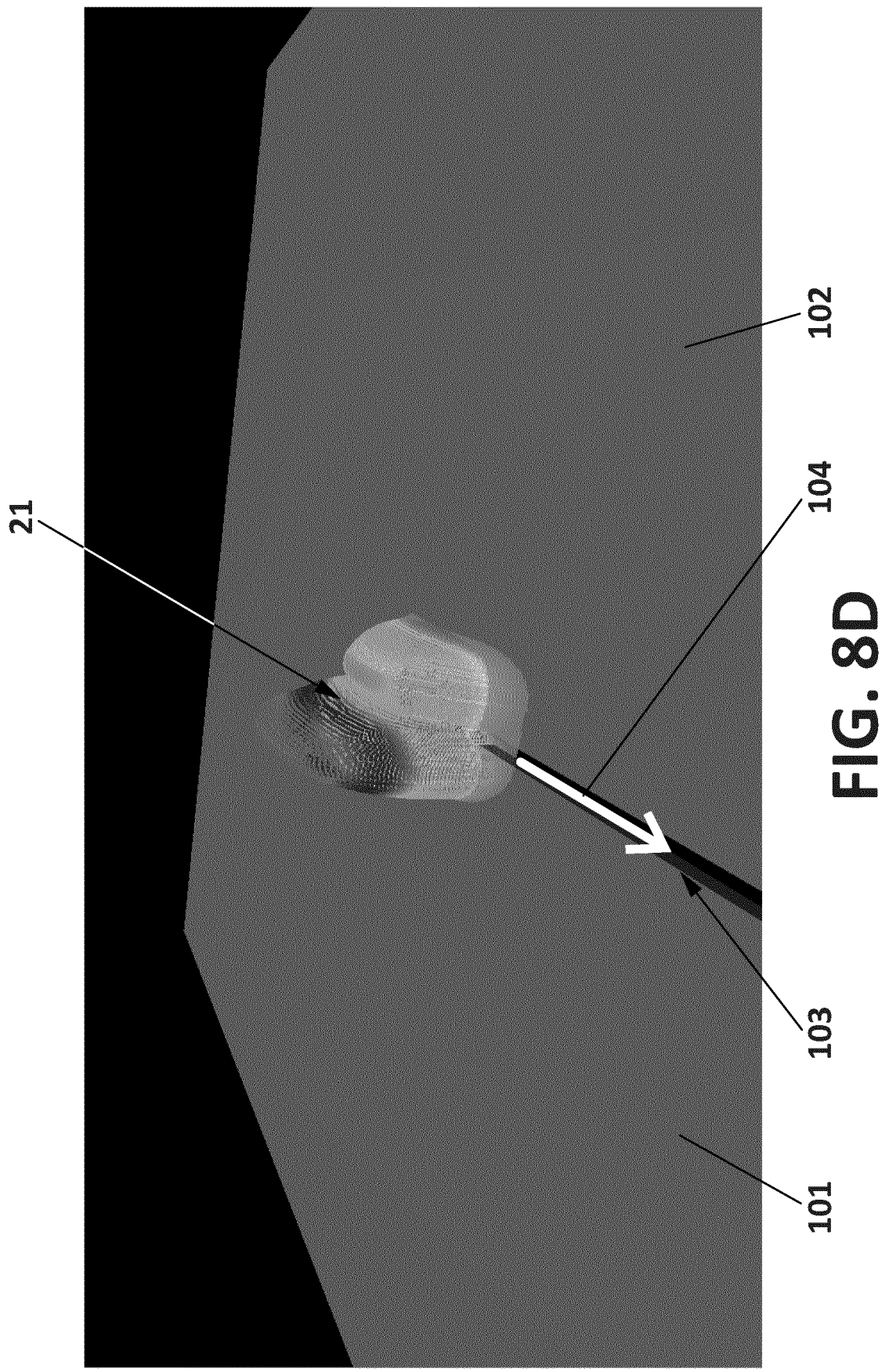

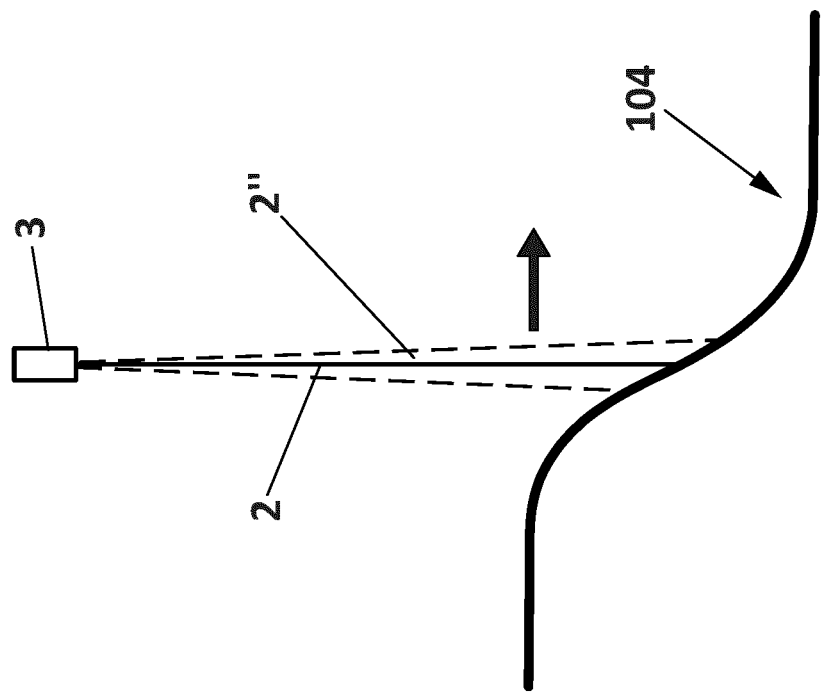
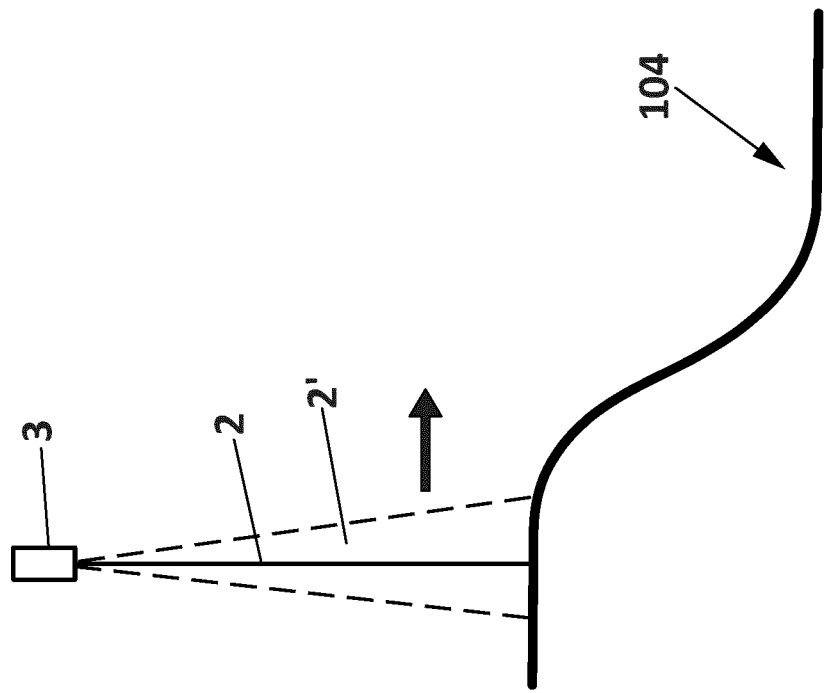

ns repetitively in two dimensions

METHOD OF AND SYSTEM FOR WELDING USING AN ENERGY BEAM SCANNED REPETITIVELY IN TWO DIMENSIONS

TECHNICAL FIELD

The present invention relates to welding using an energy beam, for example, to laser welding.

STATE OF THE ART

It is known in the art to carry out welding using an energy beam, typically a laser beam, to establish a joint between parts, for example, so as to join two parts of an object or component. For example, laser welding is frequently used for joining parts for automotive vehicle applications. Laser welding typically includes displacing a projected spot of a laser beam along an interface between two parts, to melt a portion of both parts, whereby a joint is formed when the melted material solidifies. The quality of the joint typically depends on factors such as the speed with which the spot is displaced in the direction of the weld seam, the size and shape of the spot, the power of the laser beam and the power or energy distribution within the spot. Sophisticated systems have been developed for controlling the quality of the weld, including systems based on real-time adaptation of parameters, for example, based on feedback from sensors or cameras.

Many patent documents discuss different aspects of laser welding. For example:

DE-202014105648-U1 discusses laser welding involving oscillation in two dimensions. The document refers to dynamic adaptation of parameters including oscillation depending on the height of the gap between workpieces to be joined.

DE-102014107716-B3 refers to how a preferably one-dimensional oscillation of the laser beam, overlaid on the general movement along the welding track, is dynamically adapted during welding in view of the conditions. The aim appears to be to reduce weld drops. The method involves real time monitoring.

DE-102013110523-A1 discloses how two scanning movements can be overlaid, one with a higher frequency and one with a lower frequency. Frequency and amplitude can be adapted to influence behavior of the melt pool. These two scanning movements can be overlaid on the general relative movement between laser device and workpiece.

DE-102014105941-A1 discusses laser welding with oscillation of the laser beam in parallel with and/or perpendicularly to the weld, with dynamic adaptation during the welding; modification of parameters such as amplitude and frequency is mentioned. Both 1D, 2D and 3D scanning are mentioned, including galvanometric scanning in two dimensions. The document discusses, inter alia, a preferred amplitude of 0.2-3 times the diameter of the focus diameter, oscillation in the beam power or by collimator adjustment in the axial direction of the beam, and 4D-modulation based on combining spatial and time oscillation. The method is alleged to make it possible to prevent certain defects in the weld by better controlling different aspects of the process, such as the cooling of the weld pool.

WO-2014/190971-A1 discloses soldering of a sandwich component to a solid component and suggests tailoring the energy distribution by shaping the beam or by modifying the beam power and/or the velocity of the oscillating movement of the laser beam.

DE-102013107228-B3 suggests static but also dynamic adaptation of the energy distribution, whereby the dynamic adaptation can take place on the basis of for example oscillation of the laser beam. Also adaptation of beam power in synchronization with the oscillation is discussed.

WO-2016/118555-A1 explains how various types of joints can be formed by energy beam welding, including overlap joints and fillet joints. It is stated that fillet joints are often preferred but involve the drawback that they require high position accuracy. WO-2016/118555-A1 discusses how the width of the fillet joint can be increased by oscillating the laser beam while the laser beam moves along the interface, that is, it appears to suggest oscillating the laser beam in a direction perpendicular to the longitudinal direction of the joint, that is, perpendicularly to the general direction in which the laser beam travels to form the joint; this direction will be referred to as the "longitudinal direction" or the direction of the "track" throughout this document. It is explained that the increased width of the joint (compared to the width of the joint that would be formed if the laser beam were displaced in the longitudinal direction without any overlaid oscillation) compensates for tolerances. The oscillation is not necessarily only in the transversal direction (that is, the direction perpendicular to the longitudinal direction): for example, WO-2016/118555-A1 suggests oscillating the laser beam in for example two directions, for example, following a "figure 8" pattern, during movement of the laser head in the longitudinal direction (referred to as "laterally along the interface" in WO-2016/118555-A1). It is explained how the width of the fillet joint depends on the amplitude of the oscillation of the laser beam. WO-2016/118555-A1 explains that the method can employ different oscillation amplitudes along different portions of the interface, and that other parameters such as welding speed, energy or power level provided to the laser, pulse or no pulse, oscillation type figure or pattern, frequency of the oscillation figure and focus or defocus, can be set prior to or during the welding process.

DESCRIPTION OF THE INVENTION

Whereas WO-2016/118555-A1 discloses a possibly useful tool for improving fillet welds and/or for simplifying the equipment needed for fillet welding, including compensation for tolerances, it has been found that it does not make full use of the possibilities offered by the currently available laser scanning systems.

A first aspect of the invention relates to a method for establishing a weld joint between at least a first part and a second part (generally, two metal parts, such as two parts of a vehicle component; in some embodiments, more than two parts are joined, for example, the weld joint can be established between three or more parts arranged facing each other in correspondence with an interface area), comprising the step of projecting an energy beam onto an interface area between the parts (that is, onto an area where the parts meet; the interface area generally comprises a portion of the surface of the first part and a portion of the surface of the second part). The beam is projected onto the interface area so as to produce a primary spot on the interface area, and the beam is repetitively scanned in two dimensions in accordance with a scanning pattern so as to establish an effective spot on the object, the effective spot having a two-dimensional energy distribution. The effective spot is displaced along a track over the interface area so as to progressively melt mating portions of the first part and the second part so as to form the weld joint, that is, so as to allow a weld seam to form by cooling of the melted material. The two-dimensional scanning makes it possible to carefully and exactly design the two-dimensional energy distribution, thereby making it possible to adapt it to specific conditions, both statically and dynamically.

In some embodiments of the invention, during at least a portion of the displacement of the effective spot along the track (such as during more than 50%, 75%, 90% or more, including 100%, of the displacement), the two-dimensional energy distribution is asymmetric
  in relation to any line (that is, in relation to all lines, that is, in relation to every line) extending through the effective spot in parallel with the track, and/or
  in relation to any line (that is, in relation to all lines) extending through the effective spot perpendicularly to the track.

That is, the two-dimensional energy distribution, that is, the distribution of energy applied to the interface area by the laser beam during one scan of the scanning pattern, lacks reflectional symmetry in relation to at least one of: i) all lines extending through the interface area in parallel with the track; and ii) all lines extending through the interface area perpendicularly to the track.

Traditionally, prior art systems involving two-dimensional scanning are based on reflectionally symmetric patterns, such as the "8" figure referred to in WO-2016/118555-A1 or may be circular patterns, and with an application of power that provides for a symmetric pattern, generally reflectionally symmetric in relation both to the track and to a line perpendicular to the track. This appears to be the case in WO-2016/118555-A1, where the purpose of the oscillation of the laser beam is to provide for an increased width of the weld seam, to compensate for tolerances. Opting for a symmetric pattern may often be conceived as the most appropriate solution, as asymmetry is frequently associated with defects, for example, in the field of optics, caused by defects in lenses or mirrors.

However, it has been found that an asymmetric pattern can often be preferred, for example, to allow for an appropriate heating-cooling curve so as to enhance the quality of the joint, or for welding parts that differ in terms of, for example, thickness and/or material (different materials may feature different melting points), or for adapting the effective spot to a bent portion of the interface area and/or to a curved portion of the track.

In some embodiments of the invention, during at least a portion of the displacement of the effective spot along the track (such as during more than 50%, 75%, 90% or more, including 100%, of said displacement), the two-dimensional energy distribution is asymmetric in relation to any line (that is, in relation to all lines) extending through the effective spot in the interface area (that is, the two-dimensional energy distribution totally lacks reflectional symmetry during that portion of the displacement).

In some embodiments of the invention, during said portion of the displacement, the two-dimensional energy distribution is such that the average energy density in the effective spot is substantially higher on one side of the track than on the other side of the track. In some embodiments of the invention, during said portion of the displacement, the two-dimensional energy distribution is such that a maximum power level on one side of the track is substantially higher than a maximum power level on the other side of the track. In these embodiments, the two-dimensional energy distribution in the effective spot lacks reflective symmetry at least in relation to the track. When referring to "sides" of the track, the track refers to the virtual line followed by the center of the effective spot over the interface area, that is, not the "track" that is actually heated and the width of which corresponds substantially to the width of the effective spot. When the effective spot has no clear "center", the track refers to the line followed by the central portion of the leading edge of the effective spot.

In the present context, the term "substantially" implies a difference that is intentional, that is, not due to for example minor imperfections. Typically, "substantially higher" means more than 20% higher, preferable more than 50% higher, such as more than 100% higher. The same applies to the embodiments described below, mutatis mutandis.

The use of different power levels or energy densities on different sides of the track can be appropriate for, for example, welding parts of different materials having different melting points, or parts having different thicknesses, and also, sometimes, when following a curved or bent track, whereby the velocity of the effective spot is higher at the outer radial portion of the effective spot than at the inner radial portion thereof.

In some embodiments of the invention, during said portion of the displacement, the two-dimensional energy distribution is such that the average energy density in the effective spot is substantially higher in a leading half of the effective spot than in a trailing half of the effective spot. In some embodiments of the invention, during said portion of the displacement, the two-dimensional energy distribution is such that a maximum power level in a leading half of the effective spot is substantially higher than a maximum power level in a trailing half of the effective spot. In these embodiments, the effective spot can feature a "hot leading portion", aimed at rapidly raising the temperature and preparing for melting as the effective spot moves forward along the track, and a cooler trailing portion the purpose of which is, basically or primarily, to ensure an adequate cooling curve, so as to enhance quality of the weld. The expression "leading half" and "trailing half" refers to the respective halves of the maximum extension of the effective spot along the axis parallel with the track.

In some embodiments of the invention, during said portion of the displacement, the two-dimensional energy distribution is such that the average energy density in the effective spot is substantially higher in a trailing half of the effective spot than in a leading half of the effective spot. In some embodiments of the invention, during said portion of the displacement, the two-dimensional energy distribution is such that a maximum power level in a trailing half of the effective spot is substantially higher than a maximum power level in a leading half of the effective spot. These embodiments can for example be appropriate for providing a certain pre-heating phase prior to initiation of the melting.

In some embodiments of the invention, the two-dimensional energy distribution of the effective spot is dynamically adapted during displacement of the effective spot along the track. Thereby, adaptation of the effective spot to the area or region of the interface area currently being heated can be accomplished. The expression dynamic adaptation is intended to denote the fact that adaptation can take place dynamically during displacement of the effective spot. Different means can be used to achieve this kind of dynamic adaptation, some of which are mentioned below. For example, in some embodiments of the invention, the scanning system can be operated to achieve the dynamic adaptation (for example, by adapting the operation of galvanic mirrors or other scanning means, so as to modify the scanning pattern and/or the velocity of the primary spot along the scanning pattern or along one or more segments or portions thereof), and/or the beam power and/or the size of the primary spot can be adapted. Open-loop or closed-loop control can be used for controlling the dynamic adaptation. The dynamic adaptation can affect the way in which the energy is distributed within a given area of the effective spot, and/or the actual shape of the effective laser spot, and thus the shape of the area being heated at any given moment (disregarding the fact that the primary spot is moving, and just considering the effective spot). For example, the length and/or the width of the effective spot can be adapted dynamically during the process. Dynamic adaptation, that is, adaptation during the movement of the effective spot along the track, can be useful for, for example, adapting the heating to varying conditions along the track, for example, to variations in the thickness of the parts in the interface area, to variation in the spacing between the parts, or to variations in the configuration of the parts, such as the presence of recesses, through holes, projections, deformations, curved or bent surface portions, or variations in the shape of the track; for example, the two-dimensional energy distribution can preferably be selected to be different at a curved portion of the track than at a straight portion of the track.

In some embodiments of the invention, the two-dimensional energy distribution is dynamically adapted so that it is different when the effective spot is in an area adjacent to a recess, opening, through hole or projection in one of the parts, than when it is in an area remote from said recess, opening, through hole or projection, respectively. Thus, heating can be adapted to the presence of the recess, opening, through hole or projection, providing for enhanced quality of the weld.

In some embodiments of the invention, the two-dimensional energy distribution is dynamically adapted in correspondence with variations in the thickness and/or material of at least one of the two parts in the interface area.

In some embodiments of the invention, the two-dimensional energy distribution is dynamically adapted so that it is different at a curved portion of the track than at a straight portion of the track. This can help to compensate for varying velocities of displacement between different parts of the effective spot in the curve, and to properly align the shape of the effective spot and its two-dimensional energy distribution with the track, namely, with the tangent to the curve.

In some embodiments of the invention, at least one of
power of the energy beam,
the scanning pattern and
a velocity with which the primary spot moves along at least a portion of the scanning pattern, is adapted in response to at least one change in angle between the energy beam and a portion of the interface area being heated by the effective spot.

In some embodiments of the invention, the method additionally comprises addition of material. That is, the method can optionally involve the addition of material for establishing the joint, for example, by laser cladding.

In some embodiments of the invention, the energy beam is a laser beam. A laser beam is often preferred due to issues such as cost, reliability, and availability of appropriate scanning systems. In some embodiments of the invention, the power of the laser beam is higher than 1 kW, such as higher than 3 kW, higher than 4 kW, higher than 5 kW or higher than 6 kW, at least during part of the process.

A further aspect of the invention relates to a system for welding using an energy beam, the system comprising:
means for supporting at least two parts so that they are adjacent to one another in an interface area, and
means for producing an energy beam and for projecting the energy beam onto the interface area;
wherein the system comprises a scanner for scanning the energy beam in at least two dimensions; and
wherein the system is arranged for carrying out the method described above.

In many embodiments of the invention the energy beam is a beam of electromagnetic radiation, for example, a laser beam. The effective spot can be created and adapted using, for example, techniques such as those described in WO-2014/037281-A2 or WO-2015/135715-A1, which are incorporated herein by reference. Whereas the descriptions of these publications are primarily focused on the laser hardening of journals of crankshafts, it has been found that the principles disclosed therein regarding the scanning of the laser beam can be applied also to welding of parts such as metal parts, allowing for improvements in terms of flexibility, control and speed. It also allows for improved quality of the weld joint, by allowing carefully tailored energy distributions, including options such as a hot leading portion followed by a cooler trailing portion, etc.

The displacement of the effective spot in relation to the interface area is carried out in accordance with a track that can comprise straight and/or curved portions, and/or portions in one or more planes. That is, the real/primary spot, that is, the spot that is produced by the beam at any given moment, is scanned in accordance with a scanning pattern to create the effective spot, and this effective spot can be displaced in accordance with the track. Thus, two types of movement are combined or overlaid: the movement of the primary spot in accordance with the scanning pattern, and the movement of the effective spot in accordance with the track, which in some embodiments of the invention can be a simple straight line.

The term "two-dimensional energy distribution" refers to the manner in which the energy applied by the energy beam is distributed over the effective spot, for example, during one sweep of the beam along the scanning pattern. When the effective spot is projected onto a non-planar portion or area, such as a curved portion or area such as a portion or area featuring bends, the term "two-dimensional energy distribution" refers to how the energy is distributed along and across the surface of the object, that is, to the energy distribution along and across the effective spot as projected onto the surface of the object.

The present invention allows for a relatively rapid heating of a substantial portion of the interface area due to the fact that the effective spot can have a substantial size, such as, for example, more than 4, 10, 15, 20 or 25 times the size (area) of the primary spot. Thus, heating a certain region of the interface area to a desired extent in terms of temperature and duration can be accomplished more rapidly than if the heating is carried out by simply displacing the primary spot over the entire area, for example, following a sinusoidal or meandering pattern, or a straight line. The use of an effective spot having a relatively large area allows for high productivity while still allowing the relevant portion or portions of the interface area to be heated for a relatively substantial amount of time, thereby allowing for, for example, less aggressive heating without compromising productivity. At the same time, and may be even more importantly, it provides for flexibility and capacity of adaptation of the effective spot to the specific conditions, for example, to the shape of the track and to the shape, dimensions, and materials of the parts to be welded.

The primary spot can have an area substantially smaller than the one of the effective spot. For example, in some embodiments of the invention, the primary spot has a size of less than 4 mm$^2$, such as less than 3 mm$^2$, at least during part of the process. The size of the primary spot can be modified during the process, so as to optimize the way in which each specific portion of the interface area is being heat treated, in terms of quality and productivity.

On the other hand, the use of an effective spot created by scanning the primary spot repetitively in two dimensions in accordance with a scanning pattern makes it possible to establish an effective spot having a selected two-dimensional energy distribution, which is substantially independent of the specific optics (lenses, mirrors, etc.) being used, and which can be tailored and adapted to provide for an enhanced or optimized heating of the interface area, from different points of view, including the speed with which the welding is completed (for example, in terms of cm per minute or in terms of terminated units per hour), and quality. For example, the heat can be distributed so that a leading portion of the effective spot has a higher energy density than a trailing portion, thereby increasing the speed with which melting is initiated, whereas the trailing portion can serve to maintain the heating for a sufficient time to provide for an appropriate cooling curve, thereby optimizing the velocity with which the effective spot can be displaced in relation to interface area, without renouncing on the quality of the weld seam. Also, the two-dimensional energy distribution can be adapted in relation to the sides of the effective spot, depending on the characteristics of the parts to be welded together, including aspects such as thickness, material, shape, etc. Also, the effective spot can be adapted in accordance with the tri-dimensional shape of the parts, for example, to adapt the heating to configuration of the parts in the interface area. The shape of the effective spot and/or the two-dimensional energy distribution can be adapted whenever needed, thereby adapting the process to the specific portion that is to be heated at any given moment. In some embodiments of the invention, the two-dimensional energy distribution can be varied as a function of the respective irradiation site on the part, taking into account, for example, the heat removal capability of a surrounding region. In some embodiments of the invention, the two-dimensional energy distribution can be varied taking into account desired characteristics of the weld in different sections of the joint.

Additionally, using the effective spot, created by the scanning of the primary spot in two dimensions, increases flexibility in terms of, for example, adaptation of a system to different objects to be produced. For example, the need to replace or adapt the optics involved can be reduced or eliminated. Adaptation can more frequently be carried out, at least in part, by merely adapting the software controlling the scanning of the primary spot and, thereby, the two-dimensional energy distribution of the effective spot.

The expression "scanning pattern" does not imply that the primary spot must always follow one and the same scanning pattern when creating the effective spot, but is merely intended to distinguish the movement of the primary spot that is used to create the effective spot from the movement in the longitudinal direction, along the track, according to which the effective spot is displaced or scanned in relation to the interface area.

In many embodiments of the invention, the velocity or mean or average velocity with which the primary spot is displaced in accordance with the scanning pattern is substantially higher than the velocity with which the effective spot is displaced along the track. A high velocity of the primary spot along the scanning pattern reduces the temperature fluctuations within the effective spot during each sweep of the primary spot along the scanning pattern.

Of course, the present invention does not exclude the possibility of carrying out part of the welding process operating with the primary spot in a conventional way. In some embodiments of the invention, during the process, the scanning pattern can be modified to reduce the size of the effective spot until it ends up corresponding to the primary spot, and vice-versa.

That is, it is not necessary to use the effective spot to carry out the welding of the entire joint. However, at least part of the welding is carried out using the effective spot described above.

In some embodiments of the invention, adaptation of the two-dimensional energy distribution of the effective spot is carried out by adapting the power of the beam, such as by selectively turning the beam on and off. This includes interruption of the beam at its source, as well as other options such as interruption of the beam by interference with the path of the beam, for example with a shutter, and combinations thereof. For example, when using a laser such as a fiber laser, the laser beam can be switched on and off very rapidly, thus making it possible to obtain a desired energy distribution by turning the laser beam on and off while following the scanning pattern. Thus, a desired two-dimensional energy distribution can be achieved by turning the laser beam on during certain portions, lines or parts of lines of the scanning pattern. For example, a pixelized approach can be adopted, according to which the two-dimensional energy distribution is determined by the on/off state of the laser during the different portions or segments of the scanning pattern.

In some embodiments of the invention, adaptation of the two-dimensional energy distribution of the effective spot is carried out by adapting the scanning pattern.

In some embodiments of the invention, adaptation of the two-dimensional energy distribution of the effective spot is carried out by adapting the velocity with which the primary spot moves along at least a portion of the scanning pattern.

That is, the two-dimensional energy distribution can be adapted by adapting, for example, the power of the beam— for example, by switching between different power states such as between on and off—, and/or by adapting the scanning pattern—for example, adding or leaving out segments, or modifying the orientation of segments, or completely changing a pattern for another one—, and/or by adapting the velocity with which the beam moves along the scanning pattern, such as along one or more segments thereof. The choice between different means for adapting the two-dimensional energy distribution can be made based on circumstances such as the capacity of the equipment to rapidly change between power states of the beam, and on the capacity of the scanner to modify the pattern to be followed and/or the speed with which the primary spot moves along the scanning pattern.

In some embodiments of the invention, focus of the beam is dynamically adapted during displacement of the primary spot along the scanning pattern and/or during displacement of the effective spot along the track. For example, when a laser beam is used, the laser focus along the optical axis can be dynamically modified during the process, for example, so as to vary or maintain the size of the primary laser spot while it is being displaced along the scanning pattern, and/or while the effective laser spot is being displaced in relation to interface area. For example, the optical focus can be adapted to keep the size of the primary spot constant while the primary spot is moving over the interface area (for example, to compensate for varying distances between the laser source or the scanner and the position of the primary laser spot on the interface area).

In some embodiments of the invention, the size of the primary spot is dynamically adapted during displacement of the primary spot along the scanning pattern and/or during displacement of the effective spot in relation to the interface area, so as to modify the two-dimensional energy distribution and/or the size of the effective spot.

In some embodiments of the invention, the mean or average velocity of the primary spot along the scanning pattern is substantially higher than the mean or average velocity with which the effective spot is displaced along the track. For example, the average velocity of the primary spot along the first scanning pattern can preferably be at least ten times higher, more preferably at least 100 times higher, than the average velocity with which the effective spot is displaced along the track. A high velocity of the primary spot reduces the temperature fluctuations within the effective spot during one sweep of the primary spot along the scanning pattern.

In some embodiments of the invention, the beam is scanned in accordance with said scanning pattern so that said scanning pattern is repeated by the beam with a frequency of more than 10, 25, 50, 75, 100, 150, 200 or 300 Hz (i.e., repetitions of the scanning pattern per second). A high repetition rate can be appropriate to reduce or prevent non-desired temperature fluctuations in the areas being heated by the effective spot, between each scanning cycle, that is, between each sweep of the beam along the scanning pattern. In some embodiments of the invention, the scanning pattern remains constant, and in other embodiments of the invention, the scanning pattern is modified between some or all of the sweeps of the beam along the scanning pattern.

In some embodiments of the invention, the size (that is, the area) of the effective spot, such as the average size of the effective spot during the process or the size of the effective spot during at least one moment of the process, such as the maximum size of the effective spot during the process, is more than 4, 10, 15, 20 or 25 times the size of the primary spot. For example, in some embodiments of the invention, a primary spot having a size in the order of 3 mm$^2$ can be used to create an effective spot having a size of more than 10 mm$^2$, such as more than 50 or 100 mm$^2$ or more. The size of the effective spot can be dynamically modified during the process, but a large average size can often be preferred to enhance productivity, and a large maximum size can be useful to enhance productivity during at least part of the process.

The method can be carried out under the control of electronic control means, such as a computer.

In some embodiments of the invention, the scanning pattern is a polygonal scanning pattern comprising a plurality of lines. For example, the first scanning pattern can be a polygon such as a triangle, a square or a rectangle, a pentagon, a hexagon, a heptagon, an octagon, etc. The polygon does not need to be a perfect polygon, for example, the lines making up the polygon can in some embodiments be more or less curved and the edges of the polygon where the lines meet can be rounded, etc. In other embodiments, the scanning pattern can comprise curved lines, for example, it can have the shape of an "8" or similar.

In some embodiments of the invention the scanning pattern comprises a plurality of lines, such as a plurality of straight or curved lines, which in some embodiments of the invention are arranged substantially parallel with each other. In some embodiments of the invention, there are two, three, four or more of these lines. In some embodiments of the invention, scanning patterns such as those described in WO-2014/037281-A2 or WO-2015/135715-A1 can be used.

In some embodiments of the invention, the two-dimensional energy distribution of the effective spot is dynamically adapted during displacement of the effective spot in relation to the interface area, in response to at least one change in angle between the energy beam and a portion of the surface of the object being heated by the effective spot, for example, adapting the two-dimensional energy distribution, including the shape and the size of the effective spot as well as the two-dimensional energy distribution within the effective spot, to the curvature and/or bends in the surface, and/or to variations in the angle at which the surface is oriented in relation to the scanner.

In some embodiments of the invention, at least one of the power of the energy beam, the scanning pattern and the velocity with which the primary spot moves along at least a portion of the scanning pattern, is/are adapted in response to at least one change in angle between the energy beam and a portion of the interface area being heated by the effective spot.

BRIEF DESCRIPTION OF THE DRAWINGS

To complete the description and in order to provide for a better understanding of the invention, a set of drawings is provided. Said drawings form an integral part of the description and illustrate embodiments of the invention, which should not be interpreted as restricting the scope of the invention, but just as examples of how the invention can be carried out. The drawings comprise the following figures:

FIGS. 8C-8H schematically illustrate the two-dimensional energy distribution in accordance with different embodiments of the invention.

FIGS. 10A and 10B schematically illustrate two stages of welding along a track in an interface area with curves or bends.

DESCRIPTION OF WAYS OF CARRYING OUT THE INVENTION

Figure 1:
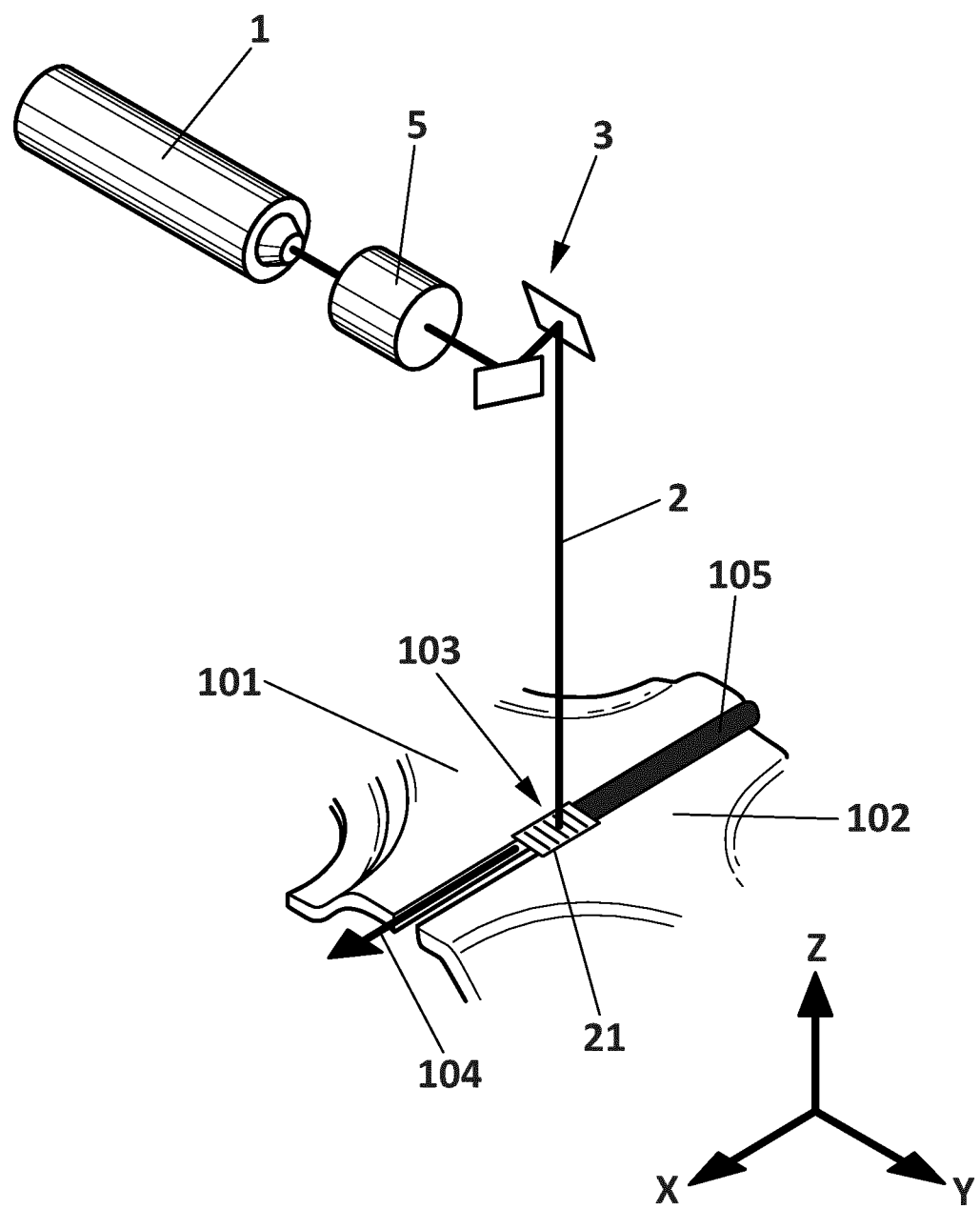
FIG. 1 is a schematic perspective view of a system in accordance with one possible embodiment of the invention.

FIG. 1 schematically illustrates a system in accordance with one possible embodiment of the invention. The system comprises a laser equipment 1 for producing a laser beam 2, and a scanner 3 including two mirrors or similar for two-dimensional scanning of the laser beam 2 in the horizontal (X-Y) plane. The equipment for producing a laser beam can, in some embodiments of the invention, be an equipment suitable for producing laser beams having a relatively high power content, such as 1 kW or more. One example of a suitable device is the Ytterbium Laser System Model YLS-6000-CT, by IPG Photonics, with a nominal power of 6 kW.

In some embodiments of the invention, the system can include means 5 for dynamically adapting the size of the primary spot (for example, so as to modify the two-dimensional energy distribution and/or the size of the effective laser spot 21) and/or the focus of the laser beam along the optical axis. This makes it possible to control (such as to vary or maintain) the size of the primary laser spot while it is being displaced along the scanning pattern, and/or while the effective laser spot 21 is being displaced in relation to interface area. For example, the optical focus can be adapted to keep the size of the primary spot constant while the primary spot is moving over the surface of the interface area (for example, to compensate for varying distances between the scanner and the position of the primary laser spot on the interface area). For example, means for dynamically adapting the focus of the laser beam can in some embodiments of the invention comprise a varioSCAN® focusing unit, obtainable from SCANLAB AG (www.scanlab.de).

The system further comprises means (not shown in FIG. 1) for holding or supporting two metal parts 101 and 102 to be welded together. The laser beam 2 is projected onto an interface area 103 where the two parts 101 and 102 mate, that is, where surfaces thereof face each other so that the two parts can be welded together. This is achieved by producing an effective spot 21 by two-dimensional scanning of the actual or primary spot of the beam, as described above. This effective spot 21 is swept along a track 104, schematically illustrated by an arrow in FIG. 1, so as to melt mating portions of the two parts, as described above. By solidification, the weld seam or joint 105 is produced. That is, in accordance with this embodiment of the invention, the laser beam (and the primary laser spot that the beam projects on the interface area) is repetitively scanned at a relatively high speed following a scanning pattern (schematically illustrated as a set of lines extending in parallel with the Y axis in FIG. 1, although any other suitable scanning pattern can be used), thereby creating an effective laser spot 21, illustrated as a square in FIG. 1. This is achieved by using the scanner 3. This effective laser spot 21 is displaced according to the track 104, for example, as shown in FIG. 1, in parallel with the X axis of the system.

The displacement of the effective laser spot 21 along the track can likewise be achieved by the scanner 3, and/or by displacement of the scanner or associated equipment, for example, along rails (not shown in FIG. 1), such as rails extending in parallel with the X axis. It can also be achieved by, for example, displacing the parts 101 and 102 in relation to the position of the scanner.

The two-dimensional energy distribution can be adapted to the specific conditions of the task to be performed, as explained above. Also, the effective laser spot and its two-dimensional energy distribution can be dynamically adapted during the displacement of the effective laser spot along the track.

Figure 2:
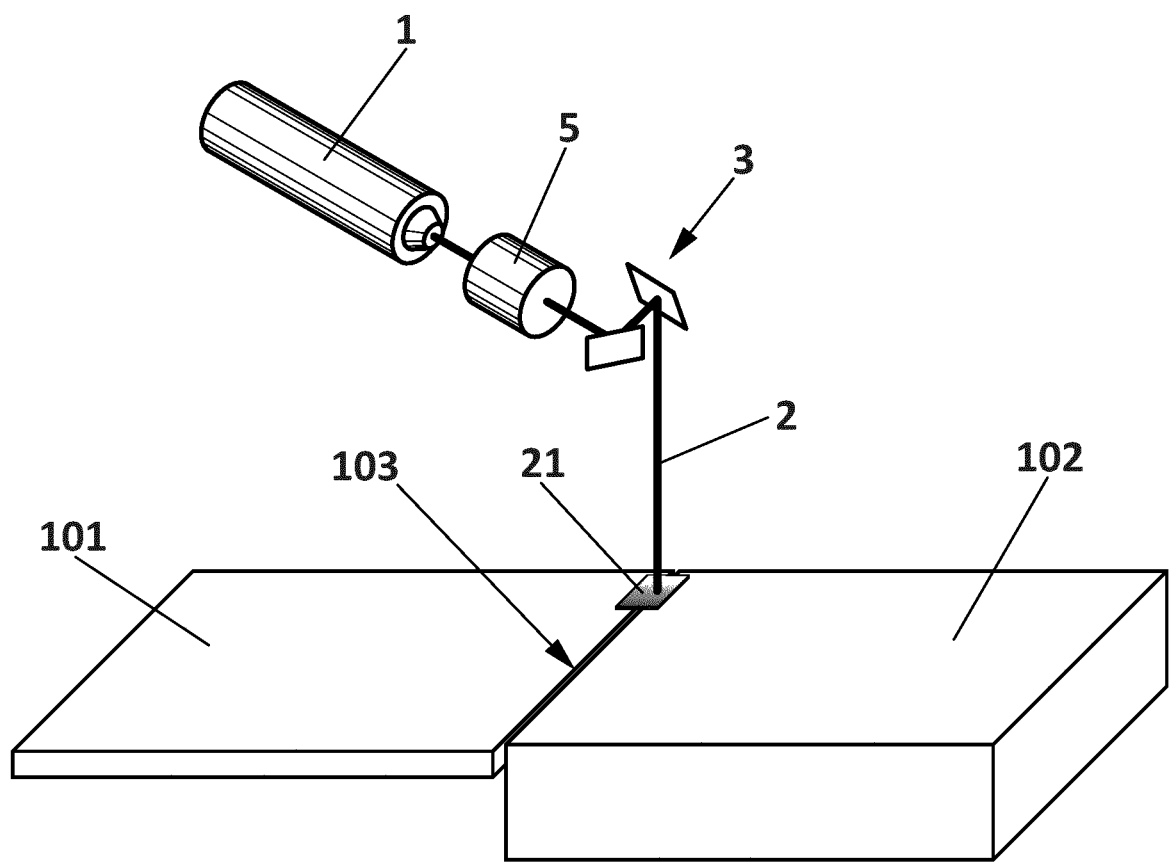
FIGS. 2-6 are schematic perspective views of the system of FIG. 1, operating in according with different embodiments of the invention.

FIG. 2 schematically illustrates how the method of the invention can be used to establish a weld joint between two parts of different thicknesses. In this case, the two-dimensional energy distribution can be set to provide more energy to the thicker part (where the heat evacuation capacity may be larger) than to the thinner part. The same applies, mutatis mutandis, when parts of materials with different melting points are to be joined.

Figure 3:
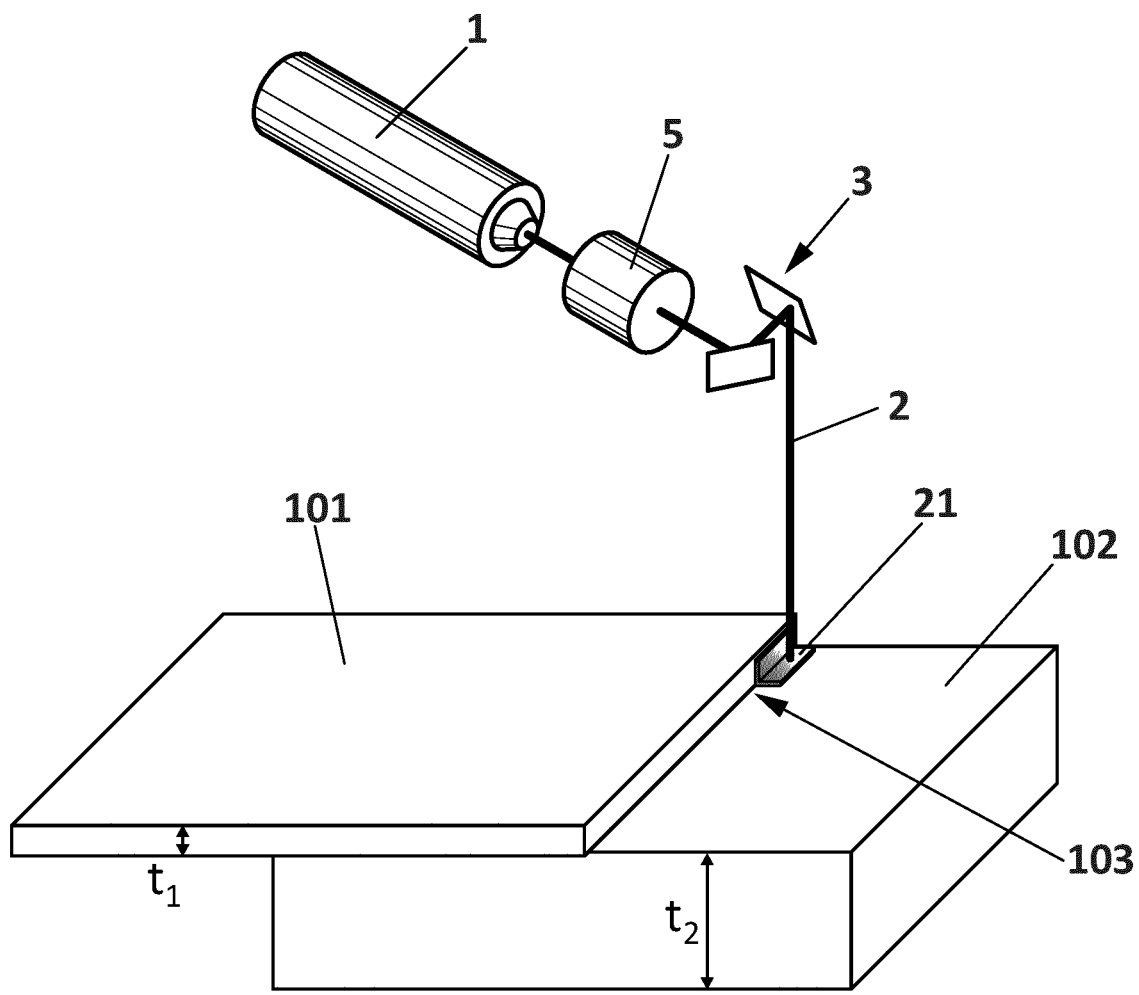

FIG. 3 schematically illustrates how the method can be used for establishing a fillet joint between two parts (in this case, two parts with different thicknesses $t_1$ and $t_2$). The hardware of the system can be the same as the one used for the embodiments of FIGS. 1 and 2, but the two-dimensional energy distribution can be set to be optimal for the specific conditions shown in FIG. 3.

Figure 4:
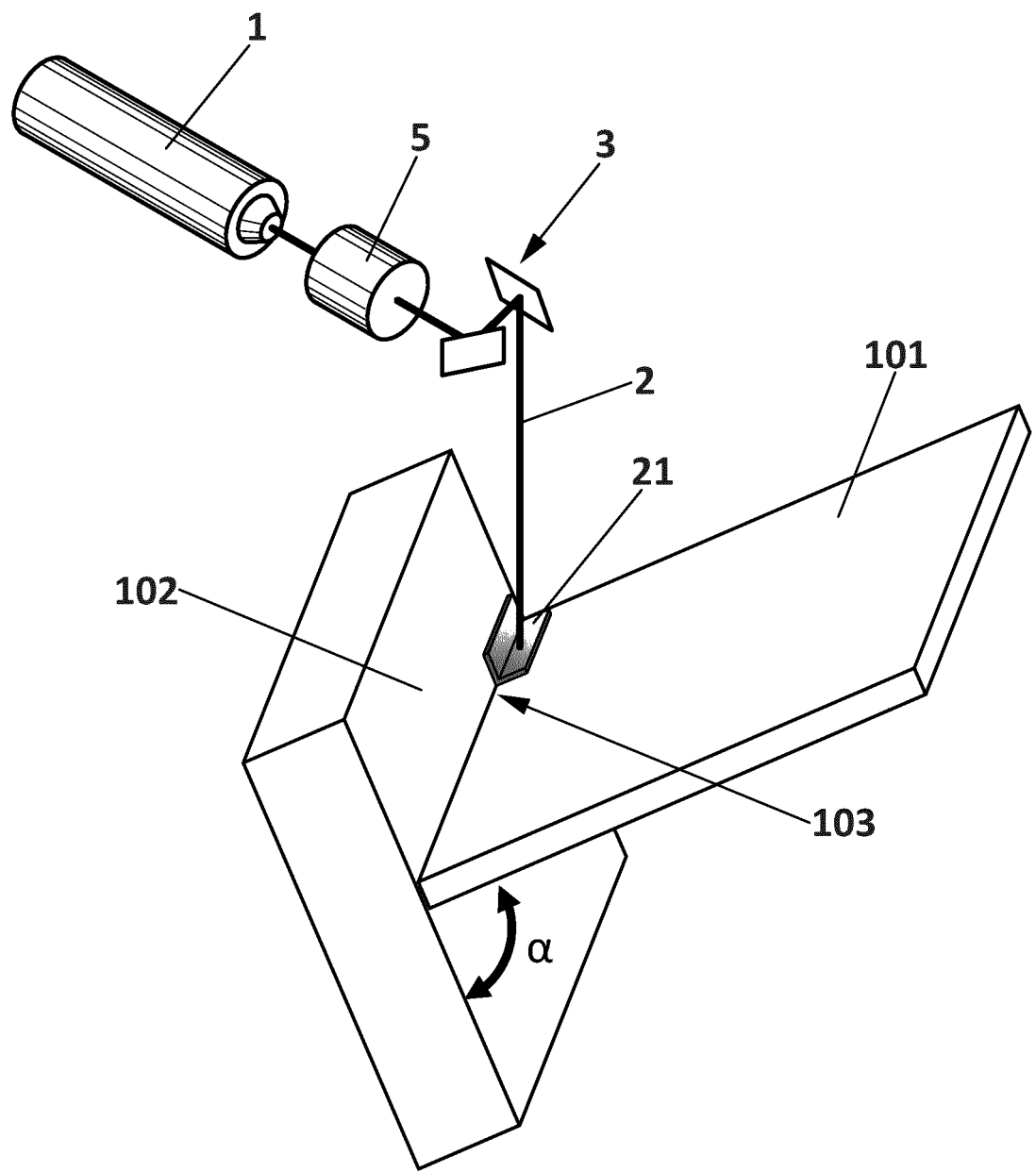

FIG. 4 schematically illustrates how for example the same system can be used for establishing a T-joint. The two-dimensional energy distribution can be selected to be optimal for the illustrated arrangement, also taking into account the angle α between the two parts 101 and 102.

Figure 5:
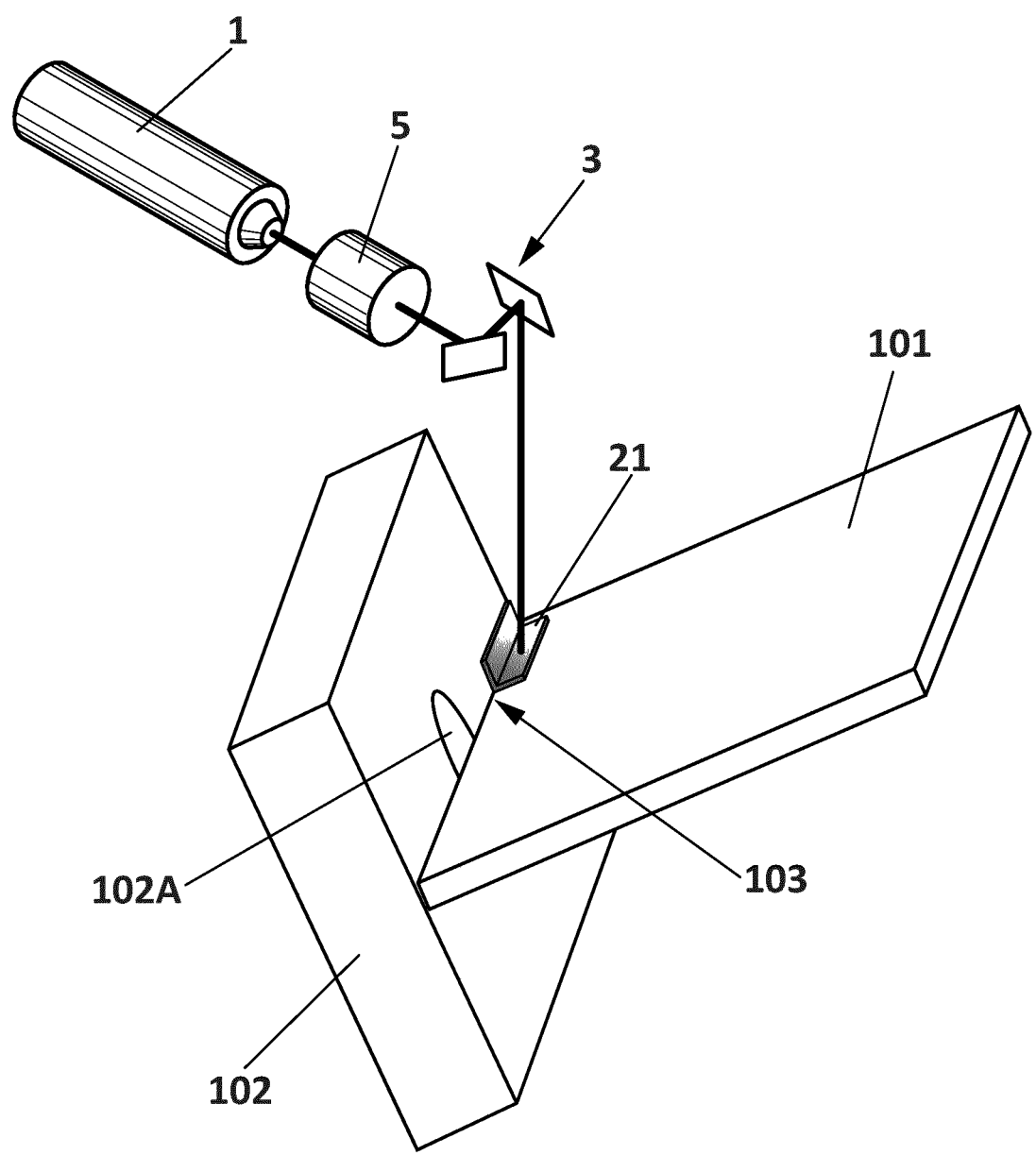

FIG. 5 schematically illustrates how the method can be used for joining two parts 101 and 102, one of which features an opening 102A in the interface area. In such a case, the two-dimensional energy distribution is preferably adapted so as to be different when the effective spot is adjacent to the opening, than when it is remote from the opening.

Figure 6:
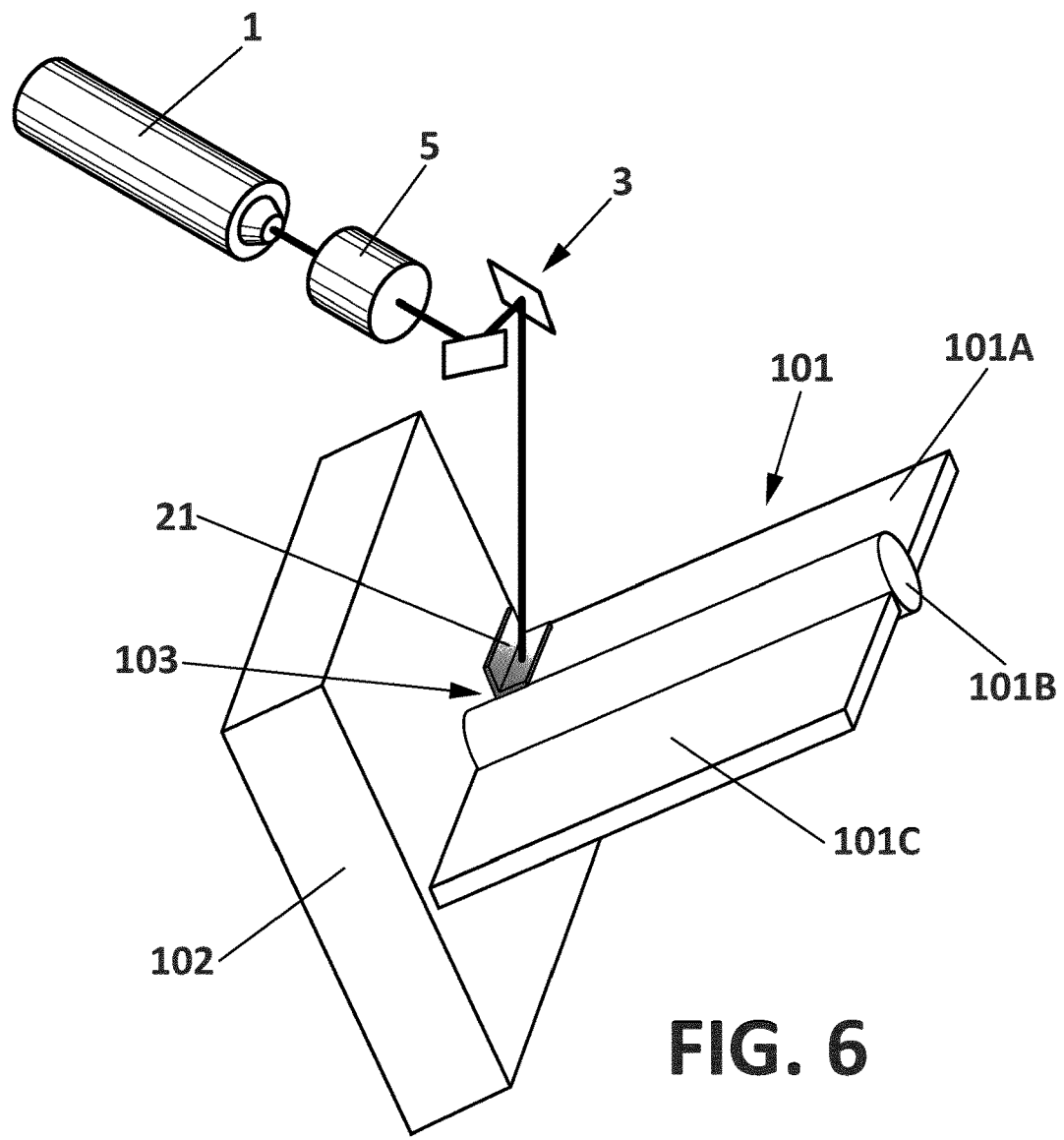

FIG. 6 schematically illustrates welding of two parts 101 and 102, one of which comprises two sections 101A and 101B of a first material, and a further section 101C of a second material, where sections 101A and 101C are planar and section 101B features a cylindrical cross section. Here, dynamic adaptation of the two-dimensional energy distribution can be preferred so as to adapt the heating to the variations in the thickness, shape and material of the part 101 along the track.

Figure 7:
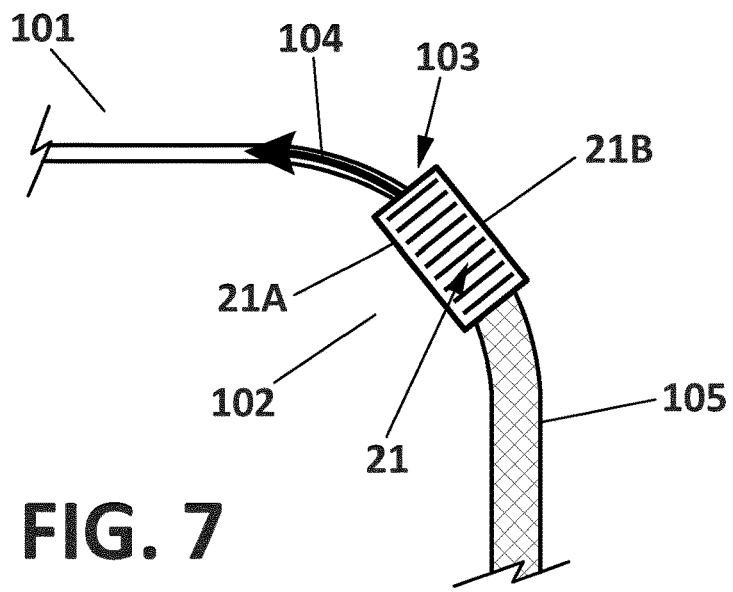
FIG. 7 is a schematic top view illustrating the method of the invention applied to welding along a partially curved track.

FIG. 7 schematically illustrates how two parts 101 and 102 having curved mating portions are welded together along a track 104 including a curved section. During movement of the effective spot 21 along the curved section of the track, the velocity at the radially inner portion 21A of the effective spot is lower than the velocity of the radially outer portion 21B. The two-dimensional energy distribution can be dynamically adapted to compensate for this difference in velocity. Also, the adaptation of the two-dimensional energy distribution can serve to properly align the effective spot with the direction of the track—that is, basically, with the tangent to the curved track—at each point along the track.

Figure 8A:
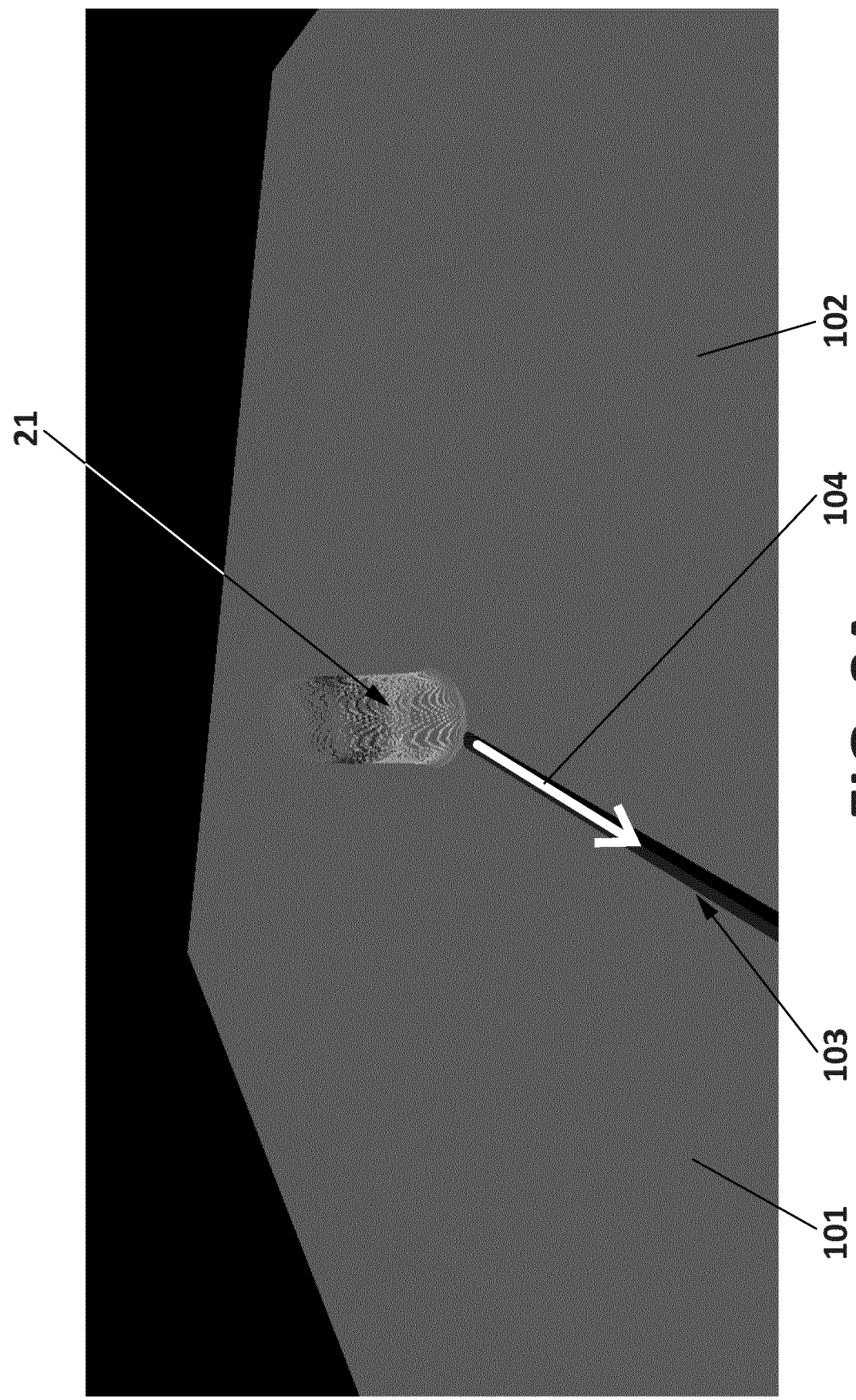
FIGS. 8A-8B schematically illustrate the two-dimensional energy distribution in accordance with two prior art methods.

FIG. 8A illustrates the two-dimensional energy distribution 21 in accordance with a prior art method for joining two parts 101 and 102 by welding. Here, a beam simply projects a spot on the interface area 103, and this spot is moved along the track 104, melting the mating surfaces of the two parts.

Figure 8B:
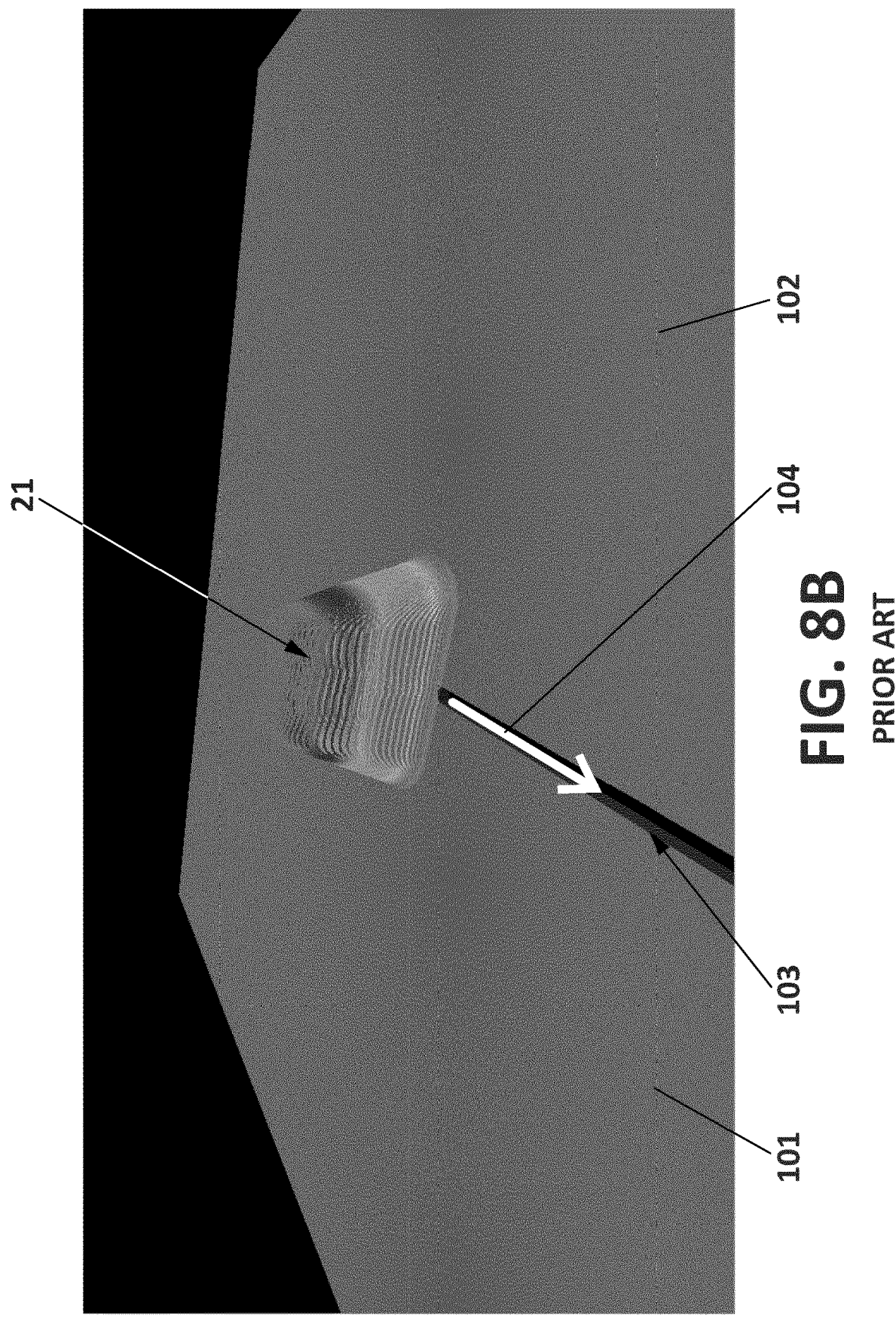

FIG. 8B schematically illustrates an arrangement in line with what is discussed in document WO-2016/118555-A1, where an effective spot is established by oscillating the beam in at least one or two dimensions, this oscillation being overlaid on the basic movement along the track; thus, this effective spot is wider than the spot shown in FIG. 8A, that is, the energy is distributed over a wider portion of the interface area, thereby providing for a wider weld seam.

Figure 8C:
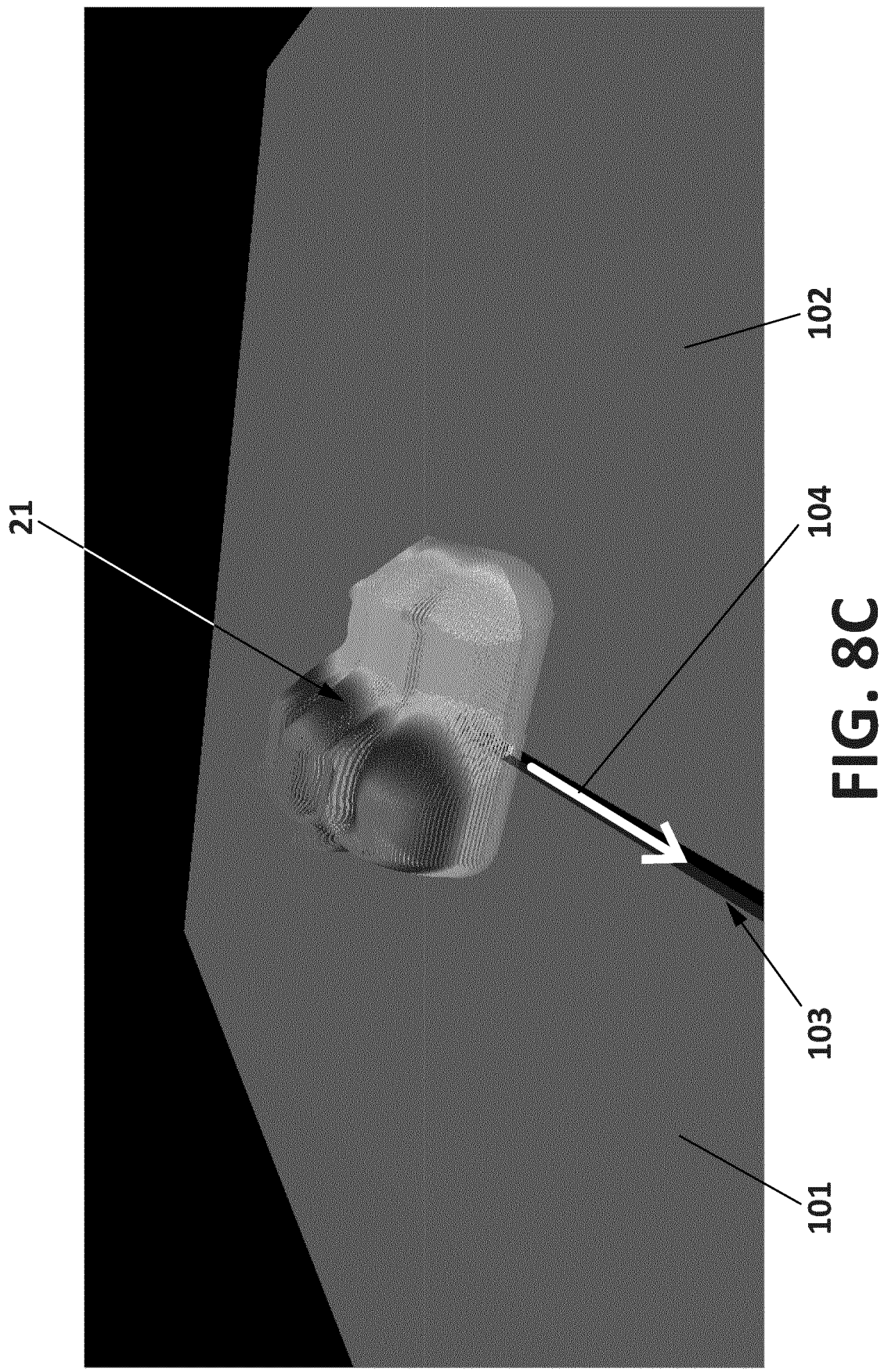

FIGS. 8C and 8D schematically illustrate how, in accordance with embodiments of the invention, the two-dimensional energy distribution is asymmetric at least in relation to all lines parallel with the track 104. Here, average power and maximum power are substantially higher on one side of the track than on the other. In this case, more power or energy is applied to the first part 101 than to the second part 102. This can be appropriate if, for example, the first part 101 is thicker in the interface area than the second part 102, or of a material with a higher melting point.

Figure 8E:
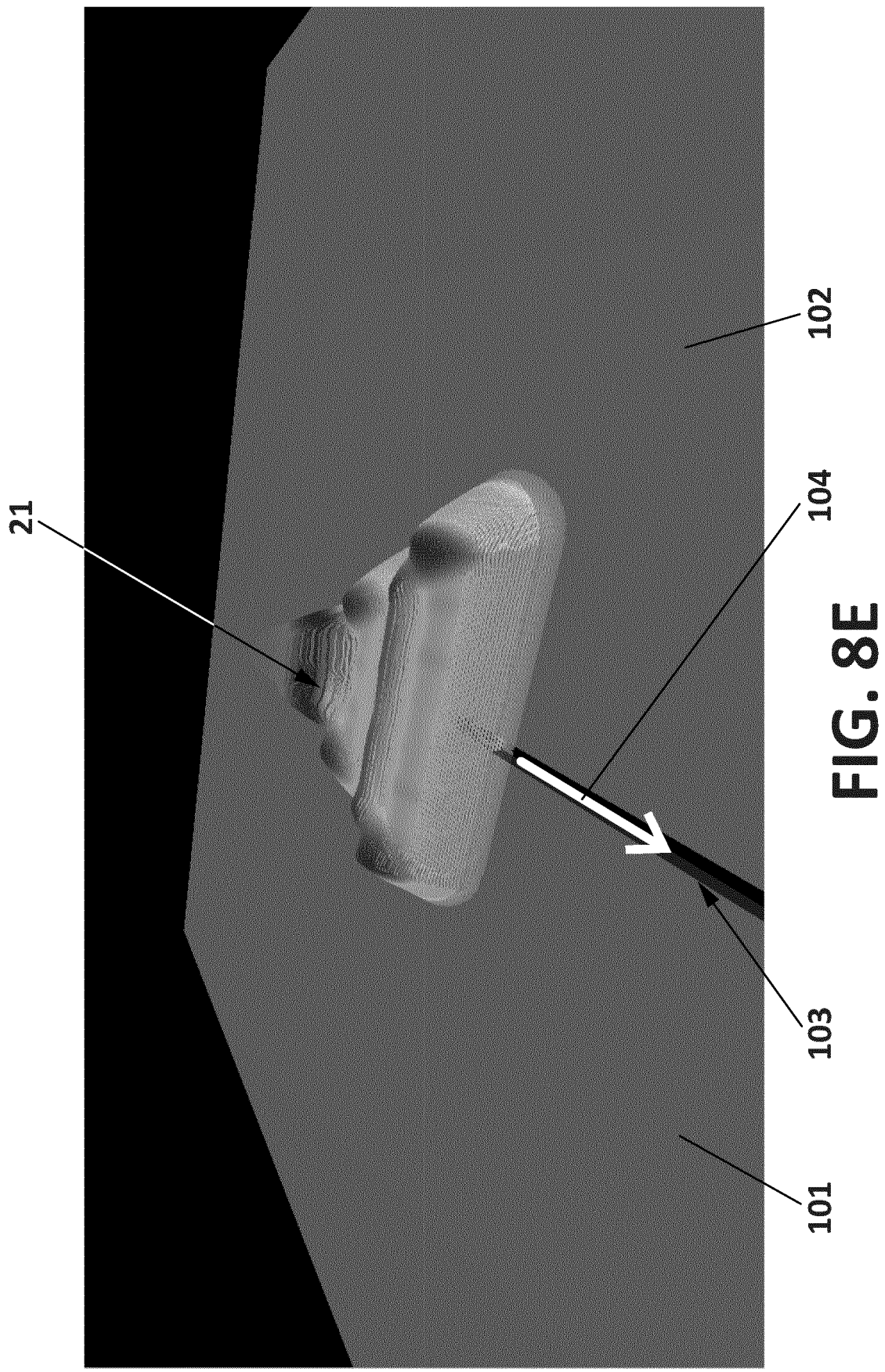

FIG. 8E illustrates a two-dimensional energy distribution with less power at the leading portion and more power at the trailing portion. This can be appropriate for pre-heating the parts prior to reaching the melting point.

Figure 8F:
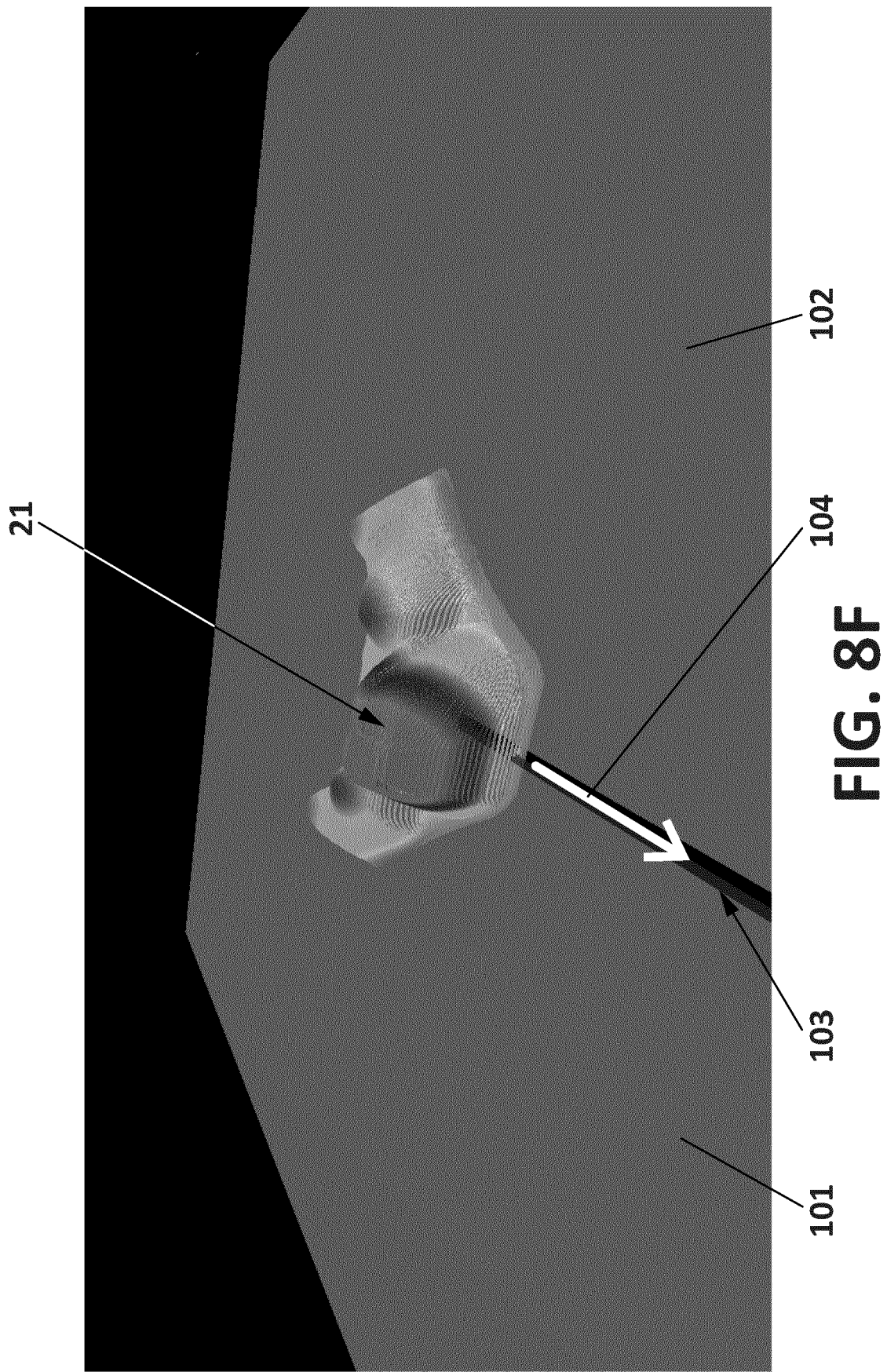

FIG. 8F illustrates an alternative arrangement, in which a maximum power level is provided at the leading portion, which helps to rapidly reach the melting temperature, whereafter the trailing portion can serve to provide for an appropriate cooling curve.

Figure 8G:
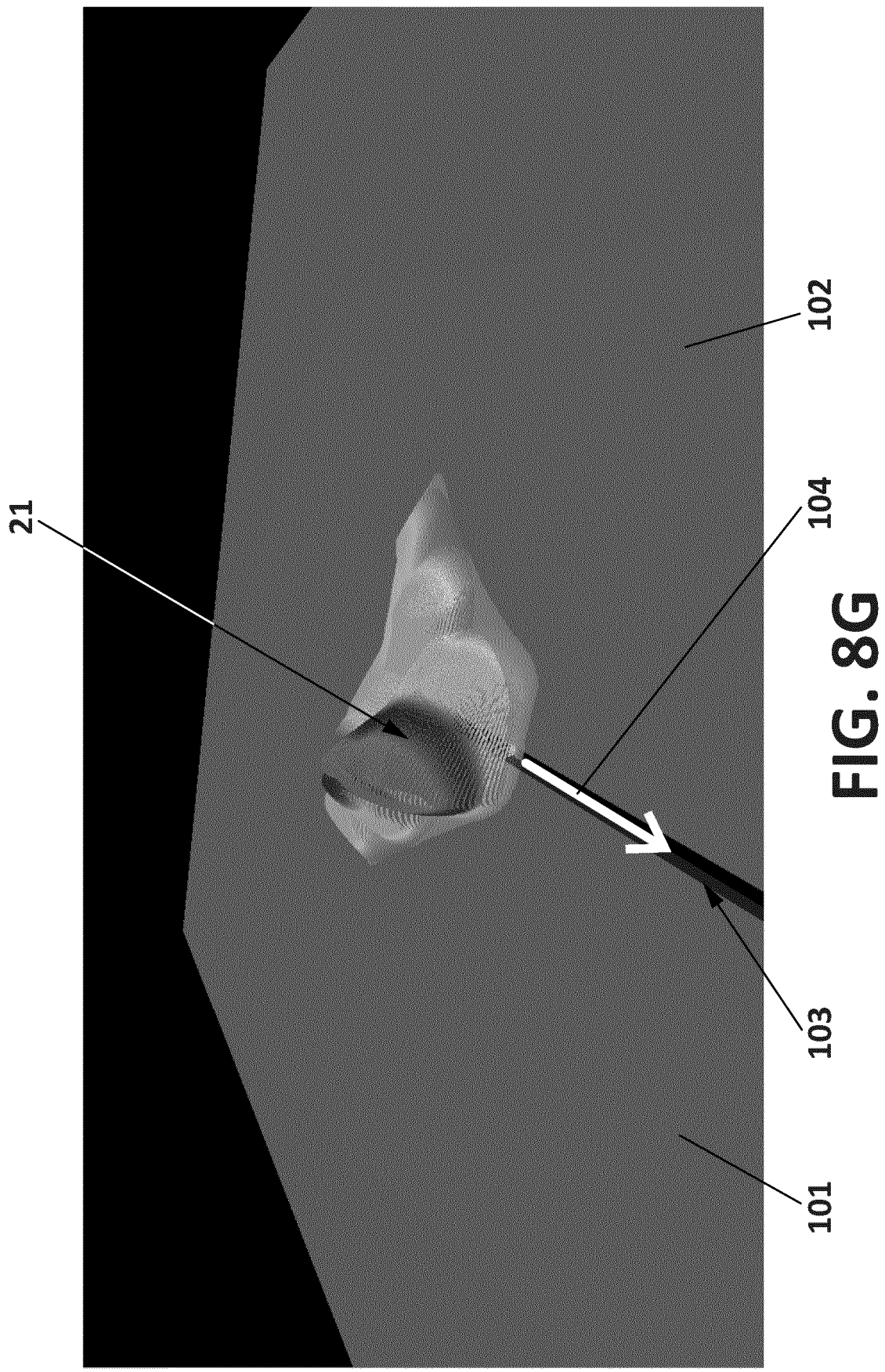
Figure 8H:
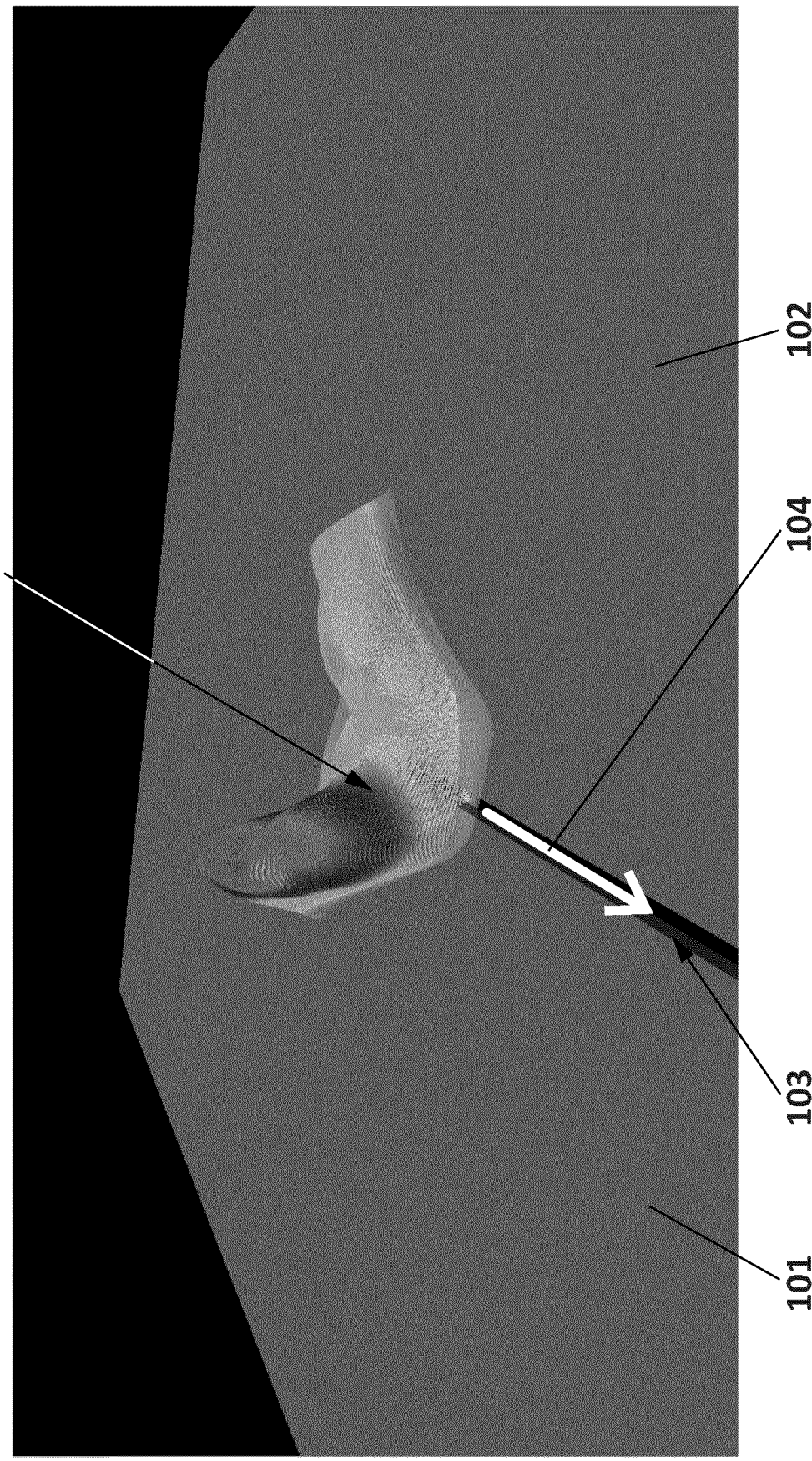

FIGS. 8G and 8H illustrate other possible arrangements, with two-dimensional energy distributions that are asymmetric in relation to all possible lines extending through the effective spot in the interface area, that is, two-dimensional energy distributions lacking any reflectional symmetry.

Thus, it is clear that by means of the present invention, the parameters of the welding process can be fine-tuned to the specific conditions (for example, shape, dimensions and materials of the parts to be welded) by adequately setting and optionally dynamically adapting the two-dimensional energy distribution.

Figure 9:
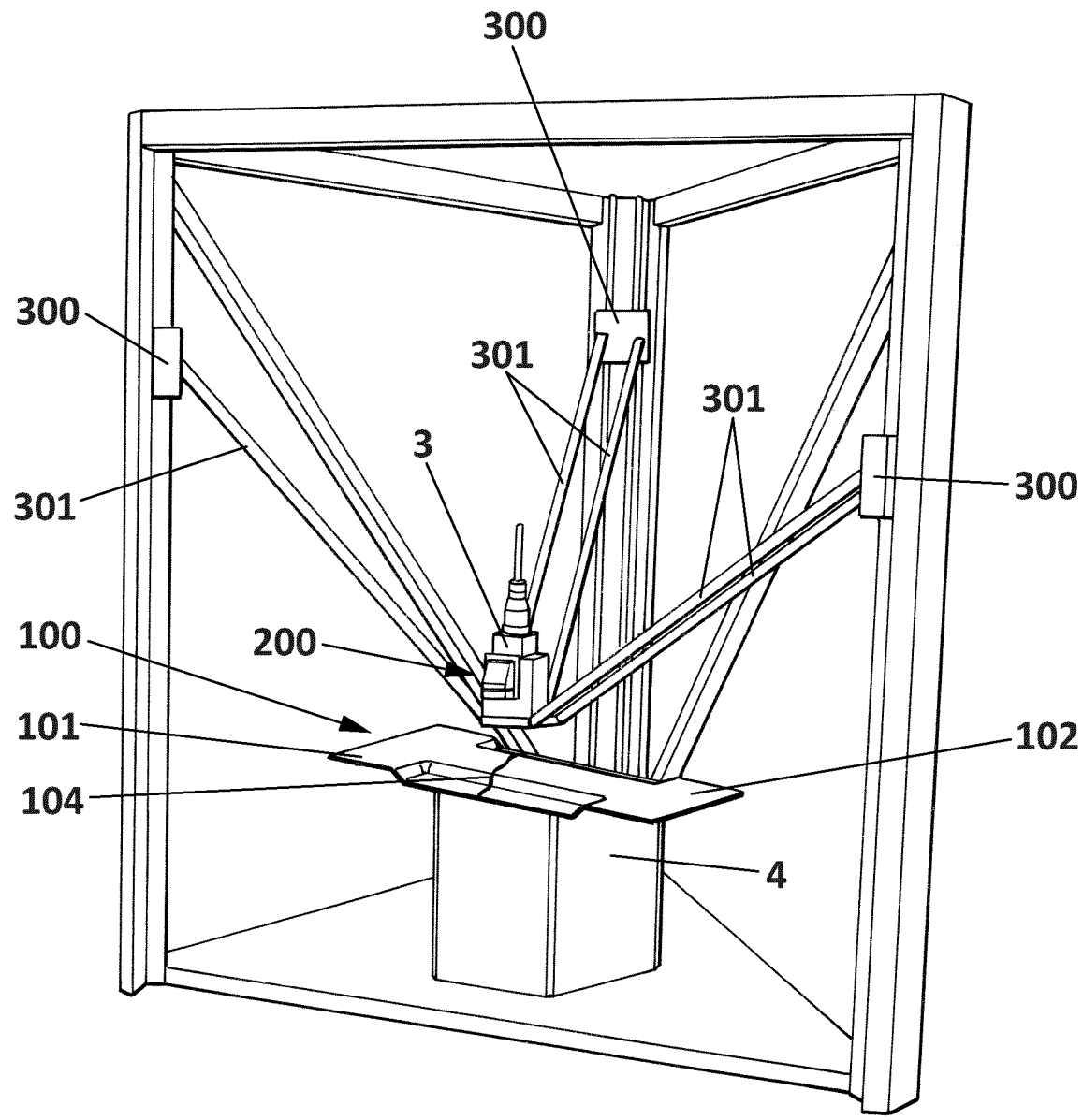
FIG. 9 illustrates an embodiment of the invention including means for displacing the scanner in relation to the interface area.

FIG. 9 schematically illustrates how a welding head 200, in accordance with one possible embodiment of the invention, can include a scanner 3 arranged to be displaced in relation to the interface area 104 between two parts 101 and 102, for welding them together. The welding head 200 is connected to actuators 300 through linkages 301. In this embodiment of the invention, the displacement is based on the parallel manipulator concept. However, any other suitable means of displacement of the welding head can be used, such as a robot arm, etc. In some embodiments of the invention, it is the parts that are to be joined that are displaced in relation to the welding head. Also, a combination of these two approaches can be used. In FIG. 9, the parts 101 and 102 are supported by schematically illustrated support means 4.

FIGS. 10A and 10B schematically illustrate how welding takes place along an interface area that features curves or bends, which can often be the case with metal vehicle components. The arrow schematically illustrates how the energy beam 2 and the effective spot move in relation to the interface area, following the track as explained above, for example, by displacement of the scanner 3 in relation to the interface area 103, by displacing the interface area in relation to the scanner 3, or a combination thereof. When the effective spot arrives at a bent portion of the interface area, there is a change in angle of incidence between the energy beam 2 and the interface area. To maintain the characteristics of the heating that is taking place, it can be desired to adapt the two-dimensional energy distribution of the effective spot. FIGS. 10A and 10B schematically illustrate how this can be achieved by, for example, modifying the scanning pattern, for example, by reducing the extension of the scanning pattern, so as to increase the power density in the area swept by the beam, perpendicular to the beam. FIGS. 10A and 10B schematically illustrate how the scanning pattern is modified by reducing the extension of the area swept by the energy beam, that is, reducing from the comparatively wide sweep 2' of FIG. 10A to the more narrow sweep 2" of FIG. 10B. And not only this: the distribution of the energy within the effective spot can be selected appropriately and adapted to the curvature of the surface within different portions of the effective spot, so that heating is carried out in an optimal manner. This is just one example of how the two-dimensional energy distribution can be adapted to accommodate for variations in the surface being heated and of how the teachings of the invention can be used for the establishment of weld joints between parts with more or less complex surfaces, adapting the two-dimensional energy distribution within the effective spot and/or within the area swept by the energy beam in a plane perpendicular to the beam, by adapting for example the scanning pattern, the power of the energy beam during different segments of the scanning pattern, and/or the velocity of the primary spot along different segments of the scanning pattern. All of this can be achieved by software and without any need for complex and adaptable optics.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A method for establishing a weld joint between at least a first part and a second part, comprising the step of projecting an energy beam onto an interface area between the parts,
   wherein the beam is projected onto the interface area so as to produce a primary spot on the interface area, and wherein the beam is repetitively scanned in two dimensions in accordance with a scanning pattern so as to establish an effective spot on the object, the effective spot having a two-dimensional energy distribution,
   wherein the effective spot is displaced along a track over the interface area so as to progressively melt mating portions of the first part and the second part so as to form the weld joint, wherein the two-dimensional energy distribution of the effective spot is dynamically adapted during displacement of the effective spot along the track,
   wherein during at least a portion of the displacement of the effective spot along the track, said two-dimensional energy distribution is asymmetric in relation to any line that could be extended through the effective spot in the interface area.

2. The method according to claim 1, wherein during said portion of the displacement, the two-dimensional energy distribution is such that the average energy density in the effective spot is substantially higher on one side of the track than on the other side of the track.

3. The method according the claim 1, wherein during said portion of the displacement, the two-dimensional energy distribution is such that a maximum power level on one side of the track is substantially higher than a maximum power level on the other side of the track.

4. The method according to claim 1, wherein during said portion of the displacement, the two-dimensional energy distribution is such that the average energy density in the effective spot is substantially higher in a leading half of the effective spot than in a trailing half of the effective spot.

5. The method according to claim 1, wherein during said portion of the displacement, the two-dimensional energy distribution is such that a maximum power level in a leading half of the effective spot is substantially higher than a maximum power level in a trailing half of the effective spot.

6. The method according to claim 1, wherein during said portion of the displacement, the two-dimensional energy distribution is such that the average energy density in the effective spot is substantially higher in a trailing half of the effective spot than in a leading half of the effective spot.

7. The method according to claim 1, wherein during said portion of the displacement, the two-dimensional energy distribution is such that a maximum power level in a trailing half of the effective spot is substantially higher than a maximum power level in a leading half of the effective spot.

8. A method for establishing a weld joint between at least a first part and a second part, comprising the step of projecting an energy beam onto an interface area between the parts,
- wherein the beam is projected onto the interface area so as to produce a primary spot on the interface area, and wherein the beam is repetitively scanned in two dimensions in accordance with a scanning pattern so as to establish an effective spot on the object, the effective spot having a two-dimensional energy distribution,
- wherein the effective spot is displaced along a track over the interface area so as to progressively melt mating portions of the first part and the second part so as to form the weld joint,
- wherein the two-dimensional energy distribution of the effective spot is dynamically adapted during displacement of the effective spot along the track,
- wherein the two-dimensional energy distribution is dynamically adapted so that it is different when the effective spot is in an area adjacent to a recess, opening, through hole or projection in one of the parts, than when it is in an area remote from said recess, opening, through hole or projection, respectively, and
- wherein during at least a portion of the displacement of the effective spot along the track, said two-dimensional energy distribution is asymmetric in relation to any line that could be extended through the effective spot in the interface area.

9. A method, for establishing a weld joint between at least a first part and a second part, comprising the step of projecting an energy beam onto an interface area between the parts,
- wherein the beam is projected onto the interface area so as to produce a primary spot on the interface area, and wherein the beam is repetitively scanned in two dimensions in accordance with a scanning pattern so as to establish an effective spot on the object, the effective spot having a two-dimensional energy distribution,
- wherein the effective spot is displaced along a track over the interface area so as to progressively melt mating portions of the first part and the second part so as to form the weld joint, wherein the two-dimensional energy distribution of the effective spot is dynamically adapted during displacement of the effective spot along the track,
- wherein the two-dimensional energy distribution is dynamically adapted in correspondence with variations in the thickness and/or material of at least one of the two parts in the interface area, and
- wherein during at least a portion of the displacement of the effective spot along the track, said two-dimensional energy distribution is asymmetric in relation to any line that could be extended through the effective spot in the interface area.

10. A method, for establishing a weld joint between at least a first part and a second part, comprising the step of projecting an energy beam onto an interface area between the parts,
- wherein the beam is projected onto the interface area so as to produce a primary spot on the interface area, and wherein the beam is repetitively scanned in two dimensions in accordance with a scanning pattern so as to establish an effective spot on the object, the effective spot having a two-dimensional energy distribution,
- wherein the effective spot is displaced along a track over the interface area so as to progressively melt mating portions of the first part and the second part so as to form the weld joint, wherein the two-dimensional energy distribution of the effective spot is dynamically adapted during displacement of the effective spot along the track,
- wherein the two-dimensional energy distribution is dynamically adapted so that it is different at a curved portion of the track than at a straight portion of the track, and
- wherein during at least a portion of the displacement of the effective spot along the track, said two-dimensional energy distribution is asymmetric in relation to any line that could be extended through the effective spot in the interface area.

11. The method according to claim 1, wherein at least one of
- power of the energy beam,
- the scanning pattern and
- a velocity with which the primary spot moves along at least a portion of the scanning pattern, is adapted in response to at least one change in angle between the energy beam and a portion of the interface area being heated by the effective spot.

12. The method according to claim 1, wherein the method additionally comprises addition of material.

13. The method according to claim 1, wherein the energy beam is a laser beam.

14. A system for welding using an energy beam, the system comprising
- means for supporting at least two parts so that they are adjacent to one another in an interface area, and
- means for producing an energy beam and for projecting the energy beam onto the interface area;
- wherein the system comprises a scanner for scanning the energy beam in at least two dimensions; and
- wherein the system is arranged for carrying out the method of claim 1.

* * * * *